United States Patent
Feuser

(10) Patent No.: US 6,320,770 B1
(45) Date of Patent: Nov. 20, 2001

(54) DATA PROCESSING DEVICE AND METHOD FOR THE VOLTAGE SUPPLY OF SAME

(75) Inventor: Markus Feuser, Buchholz (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/555,307

(22) PCT Filed: Sep. 20, 1999

(86) PCT No.: PCT/EP99/07018

§ 371 Date: May 26, 2000

§ 102(e) Date: May 26, 2000

(87) PCT Pub. No.: WO00/19366

PCT Pub. Date: Apr. 6, 2000

(30) Foreign Application Priority Data

Sep. 30, 1998 (DE) .............................. 198 45 049
Aug. 5, 1999 (DE) .............................. 199 36 919

(51) Int. Cl.[7] .................................................. H02M 3/18
(52) U.S. Cl. .................................. 363/59; 307/85
(58) Field of Search ........................ 363/59, 21, 62, 363/74, 95; 323/282, 287, 283, 285, 275; 327/536; 307/85, 87; 235/435, 492, 487

(56) References Cited

U.S. PATENT DOCUMENTS

| | | | |
|---|---|---|---|
| 4,742,291 | * | 5/1988 | Bobier et al. .......................... 320/39 |
| 4,864,292 | * | 9/1989 | Nieuwkoop .................... 340/825.31 |
| 5,206,495 | * | 4/1993 | Kreft .................................... 235/492 |
| 5,297,201 | | 3/1994 | Dunlavy .................................. 380/6 |
| 5,426,616 | * | 6/1995 | Kajigaya et al. ..................... 365/226 |
| 5,438,505 | * | 8/1995 | Cohen ................................... 363/95 |
| 5,491,623 | * | 2/1996 | Jansen ................................... 363/60 |

FOREIGN PATENT DOCUMENTS

9015489A1   12/1990  (WO) .............................. H04K/1/02

* cited by examiner

*Primary Examiner*—Rajnikant B. Patel
(74) *Attorney, Agent, or Firm*—Daniel J. Piotrowski

(57) ABSTRACT

The present invention relates to a data processing device (100), notably a chip card, which includes an integrated circuit (10) and a power supply. The power supply includes a voltage converter (12) which converts an output current $I_{aus}$ (46), powering the integrated circuit (10), into a pulsed input current $I_{ein}$ (44), where $V_{aus} \leq V_{ein}$.

10 Claims, 1 Drawing Sheet

DATA PROCESSING DEVICE AND METHOD FOR THE VOLTAGE SUPPLY OF SAME

TECHNICAL FIELD

The invention relates to a data processing device, notably a chip card, which includes an integrated circuit and a power supply as disclosed in the introductory part of Claim 1. The invention also relates to a method for powering an integrated circuit, notably in a chip card, as disclosed in the introductory part of Claim 6.

STATE OF THE ART

In many data processing apparatus provided with an integrated circuit, for example, cryptographic operations are carried out so as to protect the operation of such apparatus or the data transported in the apparatus. The arithmetic operations required for this purpose are carried out by standard processors as well as by dedicated crypto processors. A typical example of the latter processor is formed by a chip card or IC card. Data or intermediate results used in this context customarily constitute security-relevant information such as, for example, cryptographic keys or operands.

The arithmetic operations performed by the integrated circuit, for example in order to calculate cryptographic algorithms, involve the formation of logic combinations of operands or intermediate results. Depending on the technology used, such operations, notably the loading of empty or previously erased storage sections or registers with data, lead to an increased current consumption of the data processing apparatus. In the case of complementary logic, for example CMOS, an increase of the current consumption occurs when the value of a bit storage cell changes, i.e. when its value changes from "0" to "1" or from "1" to "0". The increase of the consumption is then dependent on the number of bit positions changed in the memory or register. In other words, the loading of a previously erased register causes an increase of the current consumption which is proportional to the Hamming weight of the operand (=number of bits having the value "1") written into the empty register. Analysis of this current variation could thus enable extraction of information concerning the operations executed, thus enabling successful crypto analysis of secret operands such as, for example, cryptographic keys. When several current measurements are performed on the data processing apparatus, adequate information could be extracted, for example in the case of very small signal variations. On the other hand, a plurality of current measurements could also enable a possibly required differentiation. This type of crypto analysis is also called "Differential Power Analysis" whereby an outsider could successfully perform a possibly unauthorized crypto analysis of the cryptographic operations, algorithms, operands or data purely by observing changes in the current consumption of the data processing apparatus. "Differential Power Analysis" thus enables the extraction of additional internal information of an integrated circuit beyond pure functionality.

From U.S. Pat. No. 5,297,201 it is known to combine a high frequency radiating computer with a device which also irradiates a high frequency similar to that of the computer. Consequently, an unauthorized third party can no longer decode the high-frequency radiated by the computer. However, this system cannot prevent crypto analysis by a third party having direct access to the computer.

WO 90/15489 describes a protected communication system in which dummy traffic or dummy transfers take place so as to obstruct cryptographic analysis. However, this system cannot prevent crypto analysis by a third party having direct access to the computer either.

IMPLEMENTATION OF THE INVENTION, OBJECT, SOLUTION, ADVANTAGES

It is an object of the present invention to provide an improved data processing device and an improved method of the kind set forth which eliminate the described drawbacks and offer effective protection against "Differential Power Analysis".

This object is achieved by means of a data processing device of the kind set forth which is characterized as disclosed in Claim 1.

To this end, the power supply according to the invention includes a voltage converter which converts an input voltage $V_{ein}$ into a pulsed output voltage $V_{aus}$ so as to conduct it to the integrated circuit, where $V_{aus} < V_{ein}$.

This offers the advantage that all characteristic information concerning the operations carried out by the integrated circuit is eliminated from the variation in time of the current and the voltage, so that a resultant input current for the integrated circuit can no longer be used as a source of information for differential power analysis.

Preferred further embodiments of the data processing device are described in the Claims 2 to 5.

The voltage converter in a preferred embodiment includes a switch and a control circuit for the switch, the switch being connected to ground via a capacitance and connecting, under the control of the control circuit, the capacitance alternately to the input voltage $V_{ein}$ and to the integrated circuit.

Furthermore, there is preferably provided a current-carrying supply lead with an input node which is connected to the input voltage $V_{ein}$ and an output node which outputs the output voltage $V_{aus}$ to the integrated circuit. The switch is arranged in such a manner that it interrupts the supply lead between the input node and the output node and connects, in a first position, the first capacitance to the input node via a first supply lead segment and, in a second position, to the output node via a second supply lead segment.

Preferably, the voltage converter includes an input capacitance which connects the supply lead between the input node and the first position of the switch to ground as well as an output capacitance which connects the supply lead between the second position of the switch and the output node to ground.

According to a method of the kind set forth according to the invention the supply current for the integrated circuit is converted in such a manner that on the external input only a pulsed current of constant pulse amplitude can be measured. To this end, an input voltage $V_{ein}$ is converted into a pulse width modulated output voltage $V_{aus}$ which is applied to the integrated circuit.

This offers the advantage that all characteristic information concerning the operations carried out by the integrated circuit is eliminated from the variation in time of the current and the voltage, so that a resultant input current for the integrated circuit can no longer be used as a source of information for differential power analysis.

BRIEF DESCRIPTION OF THE DRAWINGS

The invention will be described in detail hereinafter with reference to the drawings. Therein.

PREFERRED IMPLEMENTATION OF THE INVENTION

Figure 1:
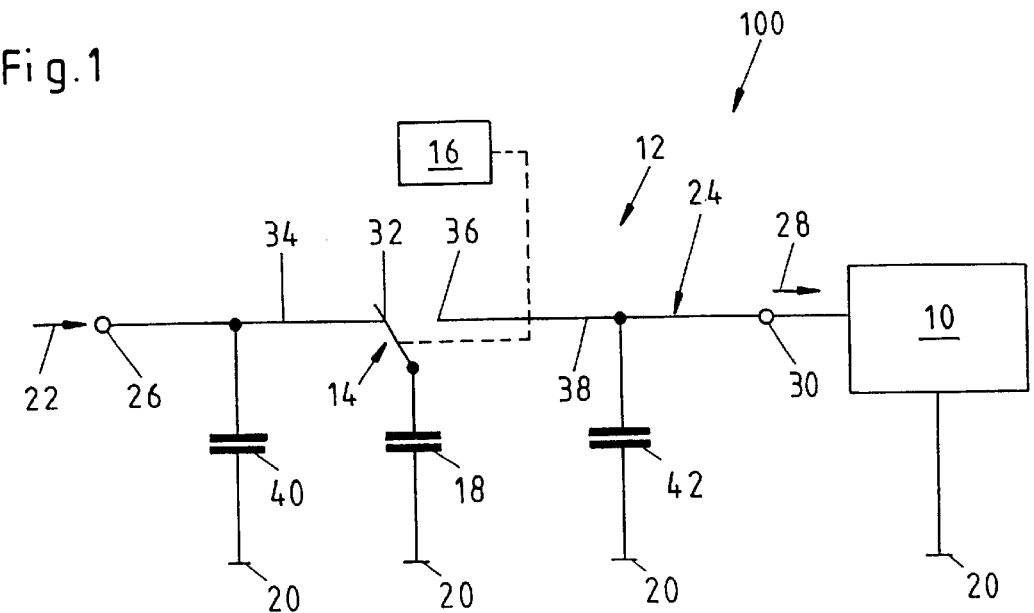
FIG. 1 shows a preferred embodiment of a data processing device according to the invention.

FIG. 1 shows a preferred embodiment of a data processing device 100 according to the invention which includes an integrated circuit 10 and a voltage converter 12 of a power supply, the remainder of which is not shown. The voltage converter 12 includes a switch 14 and a control circuit 16 for the switch 14, the switch 14 being connected to ground 20, via a capacitance 18, and connecting, under the control of the control circuit 16, the capacitance 18 alternately to an input voltage $V_{ein}$ 22 and to the integrated circuit 10.

A current-carrying supply lead 24 includes an input node 26 which is connected to the input voltage $V_{ein}$ 22 and an output node 30 which outputs an output voltage $V_{aus}$ 28 to the integrated circuit 10, the switch 14 being arranged in such a manner that it interrupts the supply lead 24 between the input node 26 and the output node 30 and connect the capacitance 18 to the input node 26, via a first supply lead segment 34, in a first position 32 and, in a second position 36, to the output node 30 via a second supply lead segment 38.

The voltage converter 12 also includes an input capacitance 40 which connects the supply lead 24 to ground 20 between the input node 26 and the first position 32 of the switch 14 as well as an output capacitance 42 which connects the supply lead 34 to ground 20 between the second position 36 of the switch 14 and the output node 30.

According to an article "Differential Power Analysis" published by Paul Kocher on the Internet under http://www.cryptopraphy.com/dpa, not only the input/output signals are analyzed but also a current consumption $I_a$ or voltage drops $\Delta U_a$ of a supply voltage $U_a$ of the integrated circuit. The success of this method of analysis is dependent on whether a number $N_A$ of analog ($I_a(t)$ or $\Delta U_a(t)$) signal variations $S(k,t)$ in time can be measured with $k=\{1, \ldots, N_A\}$ different operands in such a manner that it is possible to form a sum of the form $$T(I, t) = \sum_{k=1}^{N_A} p(i, k) \cdot S(k, t)$$

with the coefficients $p(i,k)$ where $i=\{0,1,2, \ldots\}$. When different signal variations $S(k_1,t_1)$, $S(k_2,t_1)$, $S(k_3,t_1)$ ... are observed at the same instant $t=t_1$, differential power analysis can be successful only if the integrated circuit executes the same arithmetic operation with different operands $k=\{1, \ldots, N_A\}$ at that instant, i.e. it must be possible to make the signal variations $S(k,t)$ register exactly. This holds not only for the calculation itself, but also for the input and output of data.

The invention eliminates the variations in time $I_a(t)$ or $\Delta U_a(t)$ of the supply current and the supply voltage, because only a constant supply voltage $U_{ein}$ and a pulse supply current $I_{ein}$ can be extracted from the outside. The voltage converter 12 "buffers" as if it were components of the voltage and the current which are characteristic of operations in the integrated circuit 10.

When the components of the voltage converter 12 are suitably proportioned and the switch 14 is suitably controlled, the output node 30 will carry an output voltage $V_{aus}$ 28 which is smaller than or equal to the input voltage $V_{ein}$ 22 on the input node 26 and satisfies predetermined accuracy requirements. This is achieved, for example by pulse width modulation.

The switch 14 first occupies the first position 32 in which the capacitance 18 is charged. Subsequently, the switch 14 is placed in the second position 36, the capacitance 18 then transferring its charge to the output node 30 which is buffered by the output capacitance 42 and a self-capacitance of the integrated circuit 10. The input node is buffered by the input capacitance 40.

Figure 2:
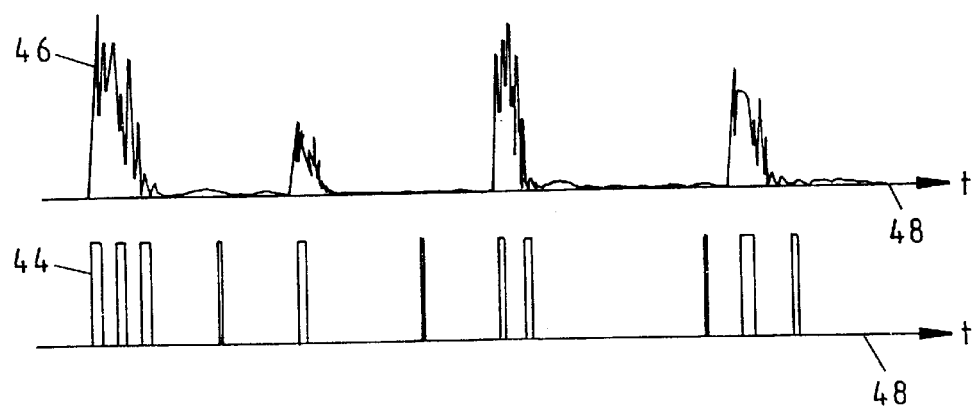
FIG. 2 shows graphically the input current and the output current, plotted on a time base, of a voltage converter for a data processing device according to the invention.

FIG. 2 illustrates the input current $I_{ein}$ 44 thus appearing on the input node 26 as well as the output current $I_{aus}$ 46 appearing on the output node 30. The currents 44, 46 are both plotted on a time base 48. Exclusively the input current $I_{ein}$ 44 is accessible from the outside. To this end, for example, the voltage converter 12 itself is constructed, possibly together with the control circuit 16, as an integrated circuit or is additionally integrated in the integrated circuit 10. As appears directly from FIG. 2, the input current $I_{ein}$ 44 does not exhibit any amplitude variations which are dependent on operations in the integrated circuit, but is pulsed at a constant amplitude. It could at the most be possible to extract information as regards the degree of activity of the integrated circuit 10, but not as regards the operations themselves performed in this circuit.

Summarizing it may be said that the voltage converter 12 provides a protection against Differential Power Analysis which masks current variations and voltage variations of the supply voltage $V_{aus}$ 28 of the integrated circuit 10 from the outside in such a manner that characteristic components of the current consumption are suppressed. Because of the lack of extractable information concerning the current consumption, therefore, Differential Power Analysis is deemed to be unsuccessful.

| LIST OF REFERENCES | |
|---|---|
| 100 | data processing device |
| 10 | integrated circuit |
| 12 | voltage converter |
| 14 | switch |
| 16 | control circuit |
| 18 | capacitance |
| 20 | ground |
| 22 | input voltage $V_{ein}$ |
| 24 | supply lead |
| 26 | input node |
| 28 | output voltage $V_{aus}$ |
| 30 | output node |
| 32 | first position of the switch |
| 34 | first supply lead segment |
| 36 | second position of the switch |
| 38 | second supply lead segment |
| 40 | input capacitance |
| 42 | output capacitance |
| 44 | input current $I_{ein}$ |
| 46 | output current $I_{aus}$ |
| 48 | time base |

What is claimed is:

1. A data processor comprising:

an integrated circuit; and a power supply, said power supply comprising a voltage buffer for protecting against crypto analysis, wherein the voltage buffer supplies an internal input current $I_{aus}$ to the integrated circuit, and draws a pulsed input current $I_{ein}$ from the external supply, where $V_{aus} < V_{ein}$.

2. The data processor of claim 1, where the voltage buffer further comprises:
   a switch; and
   a control circuit for the switch, the switch being connected to ground, via a capacitance, and alternately connecting the capacitance, under the control of the control circuit, to the external supply voltage $V_{ein}$ and to the integrated circuit.

3. The data processor of claim 2, where the voltage buffer includes a current-carrying supply lead with an input node connected to the external supply voltage $V_{ein}$ and an output node which outputs the output voltage $V_{ein}$ to the integrated circuit, the switch being arranged in such a manner that it interrupts the supply lead between the input node and the output node and connects, in a first position, a first capacitance to the input node via a first supply lead segment and, in a second position, to the output node via a second supply lead segment.

4. The data processor of claim 3, where the voltage buffer further comprises an input capacitance which connects the supply lead to ground between the input node and the first position of the switch.

5. The data processor of claim 3, where the voltage buffer further comprises an output capacitance which connects the supply lead to ground between the second position of the switch and the output node.

6. A method of powering and protecting an integrated circuit against crypto analysis, the method comprising the steps of:
   converting an external supply voltage $V_{ein}$ into a pulse width modulated output voltage $V_{aus}$; and
   supplying said $V_{aus}$ to the integrated circuit,
   where $V_{aus}$ is inaccessible to a user.

7. A method comprising:
   protecting a data processor from the crypto analysis detection of information characteristic of the operations it carries out by:
      eliminating the variations with time of its supply current and supply voltage.

8. The method of claim 7 where said variations with time are eliminated by buffering its supply current and supply voltage.

9. The method of claim 8 where the buffering is effected by a voltage buffer which supplies an internal input current $I_{aus}$ to the integrated circuit, and draws a pulsed input current $I_{ein}$ from the external supply, where $V_{aus}<V_{ein}$.

10. The method of claim 9 where only $I_{ein}$ and a constant voltage supply $V_{ein}$ are extractable from outside the data processor.

* * * * *